US011100322B2

(12) United States Patent
Annunziata et al.

(10) Patent No.: US 11,100,322 B2
(45) Date of Patent: Aug. 24, 2021

(54) CHARACTER AUTHENTICITY DETERMINATION

(71) Applicant: ONFIDO LTD, London (GB)

(72) Inventors: Roberto Annunziata, London (GB); Christos Sagonas, London (GB); Jacques Cali, London (GB)

(73) Assignee: ONFIDO LTD, London (GB)

( * ) Notice: Subject to any disclaimer, the term of this patent is extended or adjusted under 35 U.S.C. 154(b) by 144 days.

(21) Appl. No.: 16/588,425

(22) Filed: Sep. 30, 2019

(65) Prior Publication Data

US 2020/0104588 A1    Apr. 2, 2020

(30) Foreign Application Priority Data

Oct. 2, 2018  (EP) ...................................... 18198345

(51) Int. Cl.
*G06K 9/00* (2006.01)
*G06K 9/46* (2006.01)
*G06K 9/62* (2006.01)

(52) U.S. Cl.
CPC ....... *G06K 9/00577* (2013.01); *G06K 9/4609* (2013.01); *G06K 9/6256* (2013.01)

(58) Field of Classification Search
CPC .......... G06N 20/00; G06N 3/02; G06N 3/082; G06T 2207/20081; G06T 2207/20084
See application file for complete search history.

(56) References Cited

U.S. PATENT DOCUMENTS

| 7,203,837 | B2* | 4/2007 | O'Shea | H04L 9/3247 |
| | | | | 380/247 |
| 7,383,285 | B1* | 6/2008 | Pal | G06F 16/289 |
| 7,890,612 | B2* | 2/2011 | Todd | H04L 63/1483 |
| | | | | 709/220 |
| 8,355,578 | B2* | 1/2013 | Sohma | G06K 9/00469 |
| | | | | 382/176 |
| 8,543,573 | B2* | 9/2013 | MacPherson | G06T 11/206 |
| | | | | 707/736 |
| 9,213,990 | B2* | 12/2015 | Adjaoute | H04L 63/1425 |
| 9,477,756 | B1* | 10/2016 | Park | G06F 16/951 |

(Continued)

OTHER PUBLICATIONS

Annunziata, et al., "DeSTNet: Densely Fused Spatial Transformer Networks", 29th British Machine Vision Conference, Available online at: URL:https://arxiv.org/pdf/1807.04050.pdf, Sep. 3, 2018, 12 pages.

(Continued)

*Primary Examiner* — Yosef Kassa
(74) *Attorney, Agent, or Firm* — Kilpatrick Townsend & Stockton LLP

(57) ABSTRACT

A computer-implemented method for assessing if a character in a sample image is formed from a predefined selection of characters, comprising: processing a sample image with an alignment network to form a corrective transformation; applying the corrective transformation to the sample image to form a transformed image; computing a similarity of the transformed image with a corresponding reference image of a character from a predefined selection of characters to form a similarity score; and declaring the sample image not to comprise the character from the predefined selection of characters if the similarity score is less than a threshold.

19 Claims, 8 Drawing Sheets

(56) References Cited

U.S. PATENT DOCUMENTS

2013/0004076 A1    1/2013   Koo et al.

OTHER PUBLICATIONS

Anonymous, "Doc 9303 Machine Readable Travel Documents", Available online at: URL:https://www.icao.int/publications/Documents/9303_p3/cons_en.pdf, Apr. 3, 2019, 86 pages.
Anonymous, "Guidance on examining identify documents", Available online at: URL:https://assets.publishing.service.gov.uk/government/uploads/system/uploads/attachment_data/file/536918/Guidance_on-examining_identify_documents, 2016, 53 pages.
Anonymous, "When is a document deemed potentially fraudulent?", Available online at: URL:https://info.onfido.com/hubfs/Content%20(PDFs)/Fraud_Cheat_Sheet.pdf, Apr. 17, 2019, 6 pages.
EP18198345.3, "Extended European Search Report", dated Apr. 17, 2019, 12 pages.
Finovate, "Finovate 2018: Facial Check with Liveness Demo on Vimeo", Available online at: XP055577384, Video on vimeo.com: URL:https://vimeo.com/262086315, Mar. 27, 2018, 26 pages.

* cited by examiner

CHARACTER AUTHENTICITY DETERMINATION

CROSS-REFERENCES TO RELATED APPLICATIONS

This application claims priority to European Patent Application Number 18198345.3, filed Oct. 2, 2018.

FIELD OF THE DISCLOSURE

The present disclosure relates to methods and systems to determine the authenticity of characters. More specifically, the present disclosure relates to systems and a computer-implemented method for assessing if a character in a sample image is from a predefined selection of characters.

BACKGROUND OF THE INVENTION

Official documents are often used to check the details of people. This is typically done manually. For example, a representative of a car rental company may check a customer's driving license before authorising the rental of a car to the customer. Such checking implicitly requires manual verification of the authenticity of the documents presented by the customer.

One problem that is encountered is that people may use forged, or counterfeit, documents to present false details. In the case of manual verification, the authenticity of a document is assessed using an assessor's experience and many factors are taken into account. Often, an assessor will suspect a presented document is not authentic but will not be able to identify on what factor they base their assessment. An assessor's ability to assess documents will also be limited by their experience with particular types of documents. Therefore, it is likely that an assessor will struggle to accurately assess rarely used documents or documents of a new type with which they have limited experience.

Manual verification is therefore a highly skilled and labour intensive process that may lead to uncertainty and processing bottlenecks. For this reason, various systems have been developed to assist and automate aspects of this assessment. One such system uses a scanner to scan a barcode on a document and check that the barcode relates to a valid number, or a number that is associated with the details presented on the document.

However, known authenticity assessing systems have several drawbacks. For example, an up to date database of document associated information must be maintained to avoid false alerts being raised with genuine, or authentic, documents. This is a very taxing requirement given the diverse range of documents that may be presented. For example, driving licenses that are issued by one region can have a totally different format and structure to driving licenses that are issued by another region.

Moreover, not all documents use the same anti-forgery or anti-counterfeiting measures nor do they have the same features, e.g. some may not have any barcodes. It is unfeasible to have a system that can use all of the possible measures or assess all of the features that may be present.

Forgers, or fraudsters, are also continuously evolving new methods and systems to fool authenticity assessing systems. This means that authenticity assessing systems can quickly lose their efficacy at assessing. This problem when considered in the context of the vast number of types of documents that may be presented to a authenticity assessing system, and the many versions of each document type that may be presented, means designing authenticity assessing systems is an extremely challenging task.

BRIEF SUMMARY OF THE INVENTION

The present invention is defined by the independent claims, with further optional features being defined by the dependent claims.

According to a first aspect of the invention there is provided a computer-implemented method for assessing if a sample image comprises one or more characters from a predefined selection of characters, comprising: passing a sample image through an alignment network to form a transformed image, the alignment network being configured to align images of characters within the sample image with images of characters from the predefined selection of characters, and thereby generate the transformed image; computing a similarity of one or more characters within the transformed image with one or more corresponding reference images of characters from the predefined selection of characters to form a similarity score of characters in the sample image with the characters of the predefined selection of characters; and either: (i) declaring the sample image not to comprise at least one character from the predefined selection of characters if the similarity score indicates a significant enough difference; and/or (ii) declaring the sample image to: comprise solely characters from the predefined selection of characters, or a sufficient proportion of its characters are from the predefined selection of characters, if the similarity score indicates an insignificant enough difference. Optionally, the indication of the significant difference is assessed by evaluating if the similarity score is less than, or greater than, than a predefined threshold. The one or more characters may be alphanumeric characters in a single or a variety of different fonts and/or linguistic scripts. The sample and transformed images comprising one or more characters may each or both be image data in one or more of a variety of image data formats, e.g. bitmap, vector or compressed image (e.g. JPEG). Reference herein to processing the "image" mean processing of the image data. The selection of characters may be stored as one or more images comprising image data in one or more of the aforementioned formats.

The alignment network can be implemented in one or more software modules executable on a processor. The alignment network may be configured to perform the step of passing the sample image through it to form a corrective transformation, and applying the corrective transformation to the sample image to form a transformed image.

The alignment network may be trainable as a machine learning network. To train, configure and/or form the alignment network, a selections of training images can be input into the network. The training images comprise one or more unaligned images (optionally of characters) and one or more corresponding template images of pre-corrected align images (optionally of characters). In a training phase, which occurs before an operating or testing phase in which the alignment network is used to process sample images, the alignment network is formed by passing one or more unaligned images through an untrained alignment network and correcting alignment based on the current state of the alignment network, determining an error value based on the difference between the resultant output image and the corresponding template image, and adapting the alignment network using the error value. The step of adapting is done with the result that the above training process is repeated until the differences between the resultant output images and the corresponding template images are sufficiently acceptable (e.g. a predefined alignment threshold is sufficiently reached by a determined alignment score, or the error value is minimised or reaches a predefined threshold (above or below)), or until a set number of images has been processed a set number of times. Further detail of the training process is set out below. An alignment network as mentioned herein, unless otherwise stated, is an alignment network that has been pre-trained and is ready for use.

The term "align" should therefore be considered as transforming to the template images. Aligning is not necessarily aligning to a particular reference frame or orientation, as any set of template images can be used, regardless of the orientation of the individual template images in the set. However, generally, the alignment network will align characters in the sample image to a particular orientation. This is because the corresponding template images all have a common orientation and the sample image comparison with those images needs to be made against the template images in the most accurate manner possible. For example, all characters in this page have a common axis. An alignment network that was trained using images of these characters would therefore align a sample image comprising one of these characters to one or more common axes of all characters. The axes of a character may be: its vertical axis or its horizontal axis defined based on the dominant vertical or horizontal components of the character, or a rotational axis extending into/out of the character based on its centre of rotation. For example, the letter "h" has a vertical axis parallel to its right and left sides, and a horizontal axis at 90 degrees orientation tangential to the arc of the linking component between the two sides. In another example, the letter "o" additionally has a rotational axis extending at 90 degrees from its two-dimensional representation, as well as vertical and horizontal axes (depending on exact shape). The objective is to align one, two or all three of the axes between sample image and template/reference images.

Since the alignment network has been created before execution, the above methods are fast and provide an effective method to assess the authenticity of a character. Additionally, since the alignment network is bespoke, in other words, it is configured only to effectively align the characters in the sample image which are from the predefined selection of characters, the methods accurately detect non-selected characters. Therefore, the method provides a very sensitive detection of all non-selected characters without requiring any data or labelling of non-selected characters, and regardless of the form or structure of the non-selected characters.

The alignment network may comprise a conditional alignment manifold. A conditional alignment network is a computation module used to form a transformed image for a particular selection of characters. If non-selected characters are processed by the conditional alignment network the transformed image will be low quality. In other words, a conditional alignment network is a bespoke alignment network that has been created specifically to only effectively align selected characters i.e. to produce transformed images of high quality. As a consequence, and since it is not a general alignment system, the conditional alignment network will produce transformed images that are of very low quality for non-selected characters.

The quality of a transformed image of a selected character may be considered as a measure of how similar the transformed image is to a corresponding reference image of the selected character. The reference images, from which a corresponding reference image is selected, are respective images of the predefined selection of characters that are of a set alignment, set size, and set style. Quality of a transformed image of non-selected character may be considered as a measure of how similar the transformed image is to a reference image of the non-selected character. The reference image of the non-selected character being an image of the non-selected character that is of the same alignment, same size, and same style as the reference images of the predefined selection of characters.

In this way, the described method avail of the inability of the conditional alignment network to achieve high quality transformations for non-selected characters. The conditional alignment manifold may be considered to be over-fitted to the selected characters so that, whilst the selected characters get high quality transformations, the non-selected characters get low quality transformations. Therefore, the conditional alignment network's inability to achieve high quality transformations for non-selected characters, which would generally be perceived as a weakness of using a conditional alignment network, is used to advantageous effect. This switch of purpose provides character authenticity assessment methods which identity all non-selected characters, regardless of the manner in which the non-selected characters are different to the selected characters.

The conditional alignment manifold may be formed using an unsupervised machine learning algorithm. An unsupervised machine learning algorithm is a machine learning algorithm that can learn from input data without requiring the data to be fully labelled. This avoids the need to collect a large number of labelled training samples to detect non-selected character. Preferably, the unsupervised machine learning algorithm comprises a Densely Fused Spatial Transformer Network (DeSTNet), which when used in an unsupervised manner, provides a robust alignment method that is scalable to a large number of images of documents, even at high resolution.

Forming the conditional alignment manifold may further comprise training with training images comprising a selection of characters from a predefined selection of characters. The ability of the conditional alignment manifold to align is strongly limited to the predefined selection of characters. Therefore, the manifold alignment effectiveness will be highly limited to the particular selection of characters on which it is trained. This specificity is a result of the inherent and deliberate bias in the training images to only comprise characters from a predefined selection of characters. The ability to discriminate against all non-selected characters, which arises due to the manifold's inability to effectively align non-selected characters, therefore arises without the need to obtain a detailed description of the predefined selection of characters and without the need to obtain samples of any non-selected characters. This is advantageous when a detailed description of the selection of characters cannot be obtained for legal or other reasons. Moreover, it ensures the method will continue to operate even when faced with non-selected characters that differ in ways that could not have been envisaged at the time the conditional alignment manifold was formed.

Each training image may comprise a character from the predefined training selection of characters. Operating on a single character image at a time reduces the computational load in creating the alignment manifold. Moreover the size in memory of the alignment manifold, and the processing time when creating, or passing images through, the alignment manifold is reduced. Preferably, the predefined training selection of characters is the predefined selection of characters.

The predefined training selection of characters, or the predefined selection of characters, may consist of all characters that are associated with a section of an official document. In any particular official document, only a subset of the possible characters that are associated with the section of an official document may be present. However, preferably the selection of characters consists of all possible characters that are permitted to be present in the section of the official document according to the one or more standards that define the official document's structure and content.

Once a conditional alignment manifold for a section of an official document has been formed, the manifold can be repeatedly used on the corresponding section of other similar official documents. If the predefined training selection of characters associated with the section of the official document comprise all the characters associated with another part of the official document, the formed conditional alignment manifold may also be used on the other part of the official document. If multiple sections of an official document are associated with different selections of characters the above methods may be run independently for each section with different alignment manifolds being used for each section. An alignment manifold may also be formed on a predetermined training selection of characters that include characters from multiple sections, even if the characters associated with one section differ from those associated with another section.

All possible characters that are associated with the section of the official document may comprise all upper case characters and a chevron character of a font used in a Machine Readable Zone (MRZ) of an official document. An advantage of limiting the predetermined training selection of characters is that the memory size of the alignment manifold and the processing time to train and operate the alignment manifold is reduced as the number of characters on which it was trained gets reduced. Similarities between the selected characters allow further reduction. Additionally, since the ability of the alignment manifold to align generally becomes more limited as the number of characters on which it was trained is reduced, the ability of the method to discern non-selected characters is improved.

Optionally, for each training image, the training further comprises passing a training image through an alignment network to form a transformed training image. In some cases, passing a training image through an alignment network to form a transformed training image comprises evaluating a training transform to align the training image to a corresponding template image of a character from the predefined training selection of characters, and applying the training transform to the training image to form a transformed training image. The alignment manifold is therefore updated for each character that it is trained on.

For each training image, the training may further comprise computing a similarity of the transformed training image with a corresponding template image of a character from the predefined training selection of characters to form a training similarity score. The similarity may be assessed using any known similarity measure, such as normalized cross-correlation. Because the similarity measure will be high for well-aligned characters of the same type (subject to differences such as background, noise, level, and resolution), the problem of alignment manifold learning becomes a conditional similarity maximisation. In other words, the signal from the assessment of the similarity assessment of each image is used to adjust the alignment manifold. The individual transforms and the resultant alignment manifold are improved, or trained, by each training image.

Computing a similarity of the transformed training image with the corresponding template image of a character from the predefined training selection of characters to form a training similarity score may use a first training similarity testing method that comprises: performing Optical Character Recognition (OCR) on the transformed training image to recognise a sample training character; selecting a matching training image that comprises the sample training character from the predefined training selection of characters; and computing the similarity of the transformed training image with the matched training image to form a training similarity score. The first training similarity testing method, which is called using explicit OCR, has the advantage that the similarity assessment is only calculated once and so it is efficient and fast. The OCR can be performed by any known method, and may be performed on a separate system, and may have been performed before, or during, the performing of the present methods.

Computing a similarity of the transformed training image with the corresponding template image of a character from the predefined training selection of characters to form a training similarity score may also comprise a second training similarity testing method that comprises: computing the similarity of the transformed training image with each image from the predefined training selection of characters to form a plurality of reference training similarity scores; and selecting the maximum value from the plurality of reference training similarity scores to form a training similarity score. The second training similarity testing method, which is called using implicit OCR, has the advantage that OCR data is not required. This is especially useful in cases where OCR may have difficulty accurately identifying characters in training images, such as images of a complex character e.g. a Japanese Kanji character, like 訓, or degraded characters e.g. a faded character on an old driving license.

In some cases, the second training similarity testing method is only performed if the first training similarity testing method fails to complete. This provides the advantages of the faster explicit OCR method whilst ensuring the combined method is more robust as it can fall back to using implicit OCR if necessary. Implicit OCR may also be used if the method is performed and data from an OCR module is not available regardless of the reason for the data not being available. The module performing OCR may also announce a confidence in the identification of a character. The confidence value may be used to decide whether implicit OCR is necessary or not. For example, if the OCR module assigns a high confidence in an identified character there may be no reason to perform implicit OCR. Conversely, if the OCR module assigns a low confidence in an identified character it may be necessary to perform implicit OCR. In some cases, implicit OCR and explicit OCR may be performed where possible to maximise the confidence in the identification of the character in the training image.

The training transform and/or the corrective transform may be a linear global transformation. A global transformation being a rotation, translation, scaling, shearing and any combination of these transformations. In other words, any transformation that can be characterised by a global transformation matrix.

Computing a similarity of the transformed image with a corresponding reference image from the predefined selection of characters to form a similarity score further may comprise a first similarity testing method that comprises:

performing OCR on the sample image to recognise a sample character; selecting a matching image that comprises the sample character from the predefined selection of characters; and computing the similarity of the transformed image with the matched image to form a similarity score. This represents the testing, or operation, equivalent of the explicit OCR training method and has similar advantages.

Computing a similarity of the transformed image with a corresponding reference image from the predefined selection of character to form a similarity score further may comprise a second similarity testing method that comprises: computing the similarity of the transformed image with each image from the predefined selection of characters to form a plurality of reference similarity scores, each image comprising a character from the predefined selection of characters; and selecting the maximum value from the plurality of reference similarity scores to form a similarity score. This represents the testing phase, or operation, equivalent of the implicit OCR training method and has similar advantages.

As in training during operation, the second similarity testing method may only performed if the first similarity testing method fails to complete. This has the same advantages as in training and all combinations and uses of explicit OCR and implicit OCR previously described may also occur during operation.

Typically, the sample image is an image of a character. This simplifies the computations calculation and helps reduces the effect of variation in spacing between words and characters. Avoiding assessment of combinations of characters also means: that the alignment network needs less data for training, that training is simplified, and that operation speeded up.

According to a second aspect of the invention there is a computer-implemented method for testing the authenticity of an official document, comprising: obtaining an official document image of an official document; identifying one or more characters in the official document image; for at least one identified character, segmenting the official document image to form at least one sample image, each sample image comprising an identified character; for each sample image, assessing if the sample image comprises a character from a predefined selection of characters using the computer-implemented method of any of the above-described methods; and declaring the official document not to be genuine if a set number of sample image are declared not to comprise a character from the predefined selection of characters, wherein the predefined selection of characters is a selection of characters associated with at least a part of the official document. Testing the authenticity of official documents by assessment of their characters provides a subtle and robust test. Since the described assessment methods are tuned to the predefined selection of characters they operation ensures that any deviation of characters from the selected characters will be detected. Therefore, the method does not have to wait to be updated when new fraud techniques are discovered. In particular, it does not require fraudulent data, such as forged images or forged official documents, to be collected and analysed by experts which can significantly slow-down the deployment of other known systems. In contrast, operators of services using official document authenticity systems, herein known as operators, generally acquire images of genuine official document quickly, and/or have available to them a large quantity of imagery of genuine official documents. Therefore, an official document authenticity assessment system can be easily produced, and maintained, with commonly available data using the above methods.

The set number of sample images may be one sample image. This will enable the methods to detect a forged official document if even a single character has been altered by a forger.

The predefined training selection of characters may be the selection of characters associated with at least a part of the official document. In particular, the part of the official document may be a MRZ. The selection of characters may then be all upper case characters and a chevron. Limiting to characters of one part of the official document speeds up training and operational speed and reduces the size of memory needed for the alignment network.

The method for testing the authenticity of an official document may further comprise issuing a communication depending on whether the official document was declared to be genuine or not. Informing a user of the outcome has the advantage that it may prompt them to repeat the authenticity test with another official document or to repeat the test after acquiring a new image of the same official document. Informing an operator alerts them to the outcome of the assessment, which allows them to respond appropriately.

Some embodiments of the present invention relate to a computer-readable medium comprising executable instructions for performing the method of any one of the above-described methods.

Some embodiments of the present invention relate to a computer comprising a processor configured to execute executable code stored in memory, wherein the executable code comprises instructions for performing any one of the above described methods.

Some embodiments of the present invention relate to a system comprising at least two computers having computing modules which cooperate to perform the method of any one of the above-described methods.

According to a third aspect of the invention there is a computer-implemented method for forming an alignment network for a predefined training selection of characters comprising: acquiring a plurality of training images, each training image comprising a character from a predefined training selection of characters; and for each training image, performing the following steps: passing a training image through a DeSTNet to form a transformed training image; computing the similarity of the transformed training image with a corresponding template image of a character from the predefined training selection of characters to form an error signal; and training the DeSTNet with the error signal, wherein after the plurality of training images has been processed, the densely fused spatial transformer network comprises an alignment network for the predefined training selection of characters. This provides an unsupervised training method to produce conditional alignment manifolds that only requires training images comprising a predefined selection of characters. The method is scalable and particularly beneficial in situations in which there is no, or limited, quantities of data that represent non-selected characters.

BRIEF DESCRIPTION OF THE DRAWINGS

The present disclosure is made by way of example only with reference to the accompanying drawings in which.

DETAILED DESCRIPTION OF THE INVENTION

Figure 1:
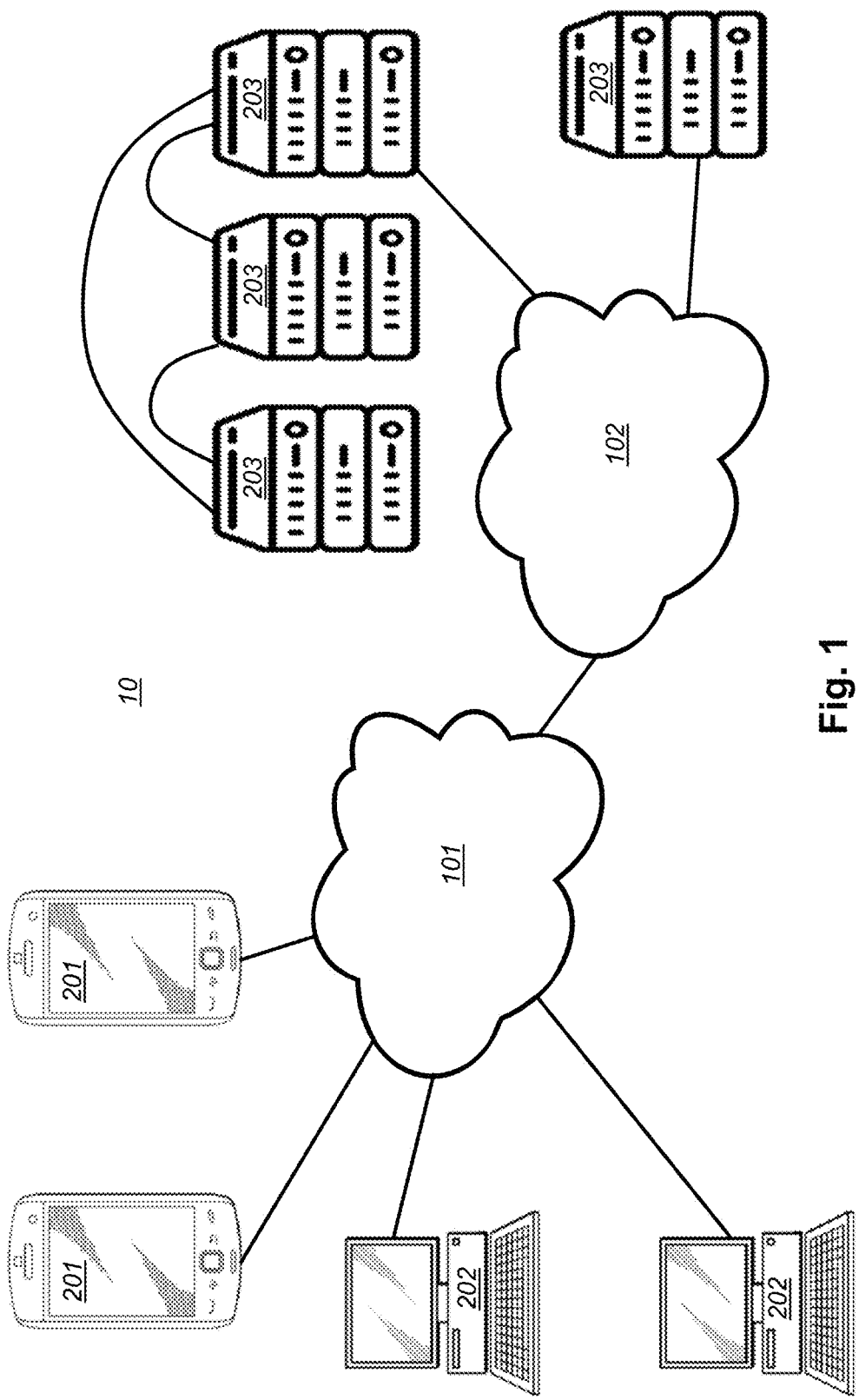
FIG. 1 is a component diagram of a system that may be used to implement the present invention.

FIG. 1 shows a system 10 in which according to one embodiment the invention is implemented. The system comprises electronic devices 201, 202, including mobile electronic devices 201, fixed location electronic devices 202 and servers 203. The electronic devices are in communication with at least one communication network 102 (which may include, but not necessarily include wireless network 101). Data may be communicated between the electronic devices. The at least one communication network may comprise the Internet, The wireless network may for example be a cellular or WiFi communication network, or any other conventionally known wireless communication network. The described network architecture is only exemplary and modifications to it, including removing or adding of network components are possible without affecting the operation of the invention.

Figure 2:
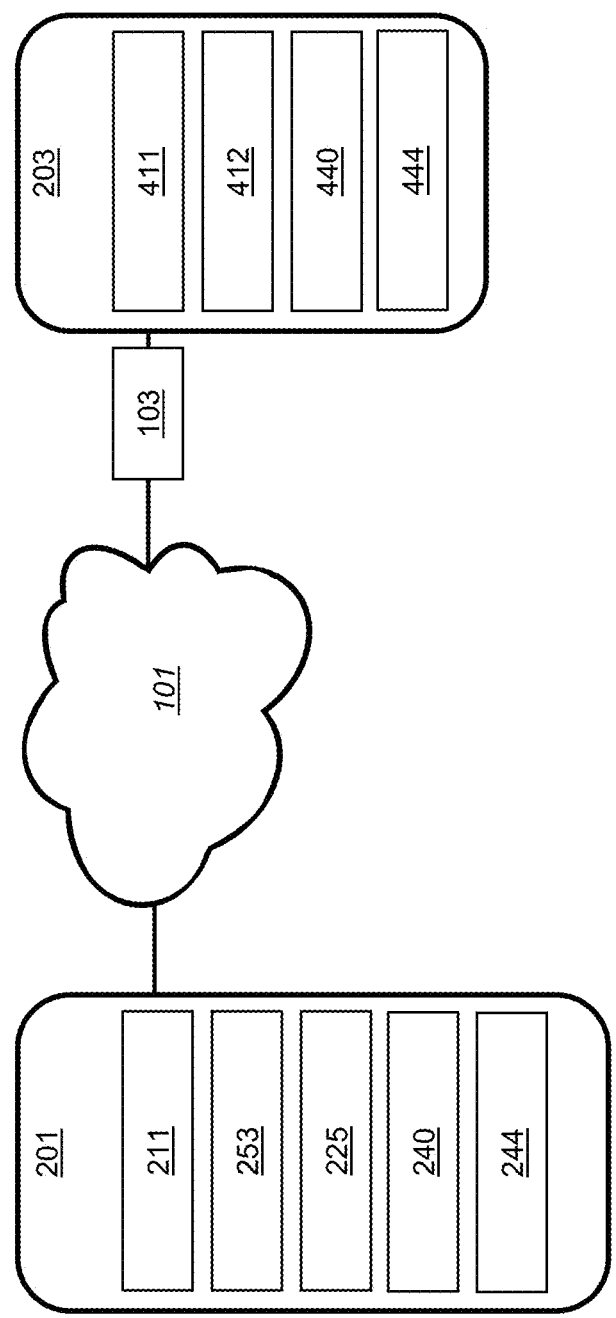
FIG. 2 is a diagram showing components of the system of FIG. 1.

FIG. 2 shows selected aspects of the network system 10 shown in FIG. 1. Specifically, it shows a mobile electronic device 201 in communication, over the wireless network 101, with a server 203. The server 203 is an electronic device that can be accessed across the network 102 by devices 201, 202 to perform computational tasks. The mobile electronic device 201 comprises a communication subsystem 211 to enable communication across the wireless network 101. The mobile electronic device 201 further comprises at least one application 225 that can be executed on a processor 240 and a camera 253 that can be used to acquire image data. The image data and applications 255 are stored in memory 244 on the mobile electronic device.

FIG. 2 also shows a server 203 which is connected to the wireless network 101 by a wireless network interface 103 and a network interface 411. The server 203 further comprises applications 412 that can be executed on a processor 440. The server further comprises memory 444 on which the applications 412 and any data that is received from the wireless network 101, and any electronic device connected thereto, can be stored. The server 203 may be distributed and comprise multiple servers, several processors and/or several memory storage locations. Such a distributed server may operate by distributing computational tasks and data across its constitute parts and may communicate with other servers to perform computational operations.

Figure 4:
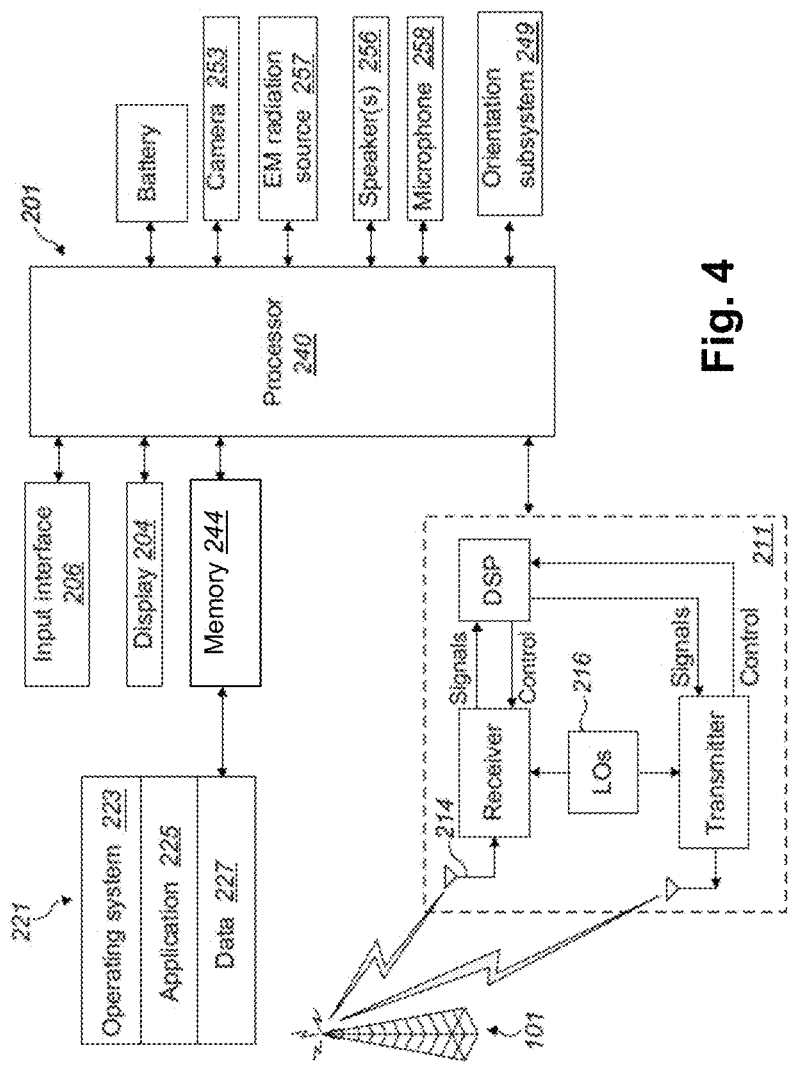
FIG. 4 is a schematic diagram of components of the electronic device of FIG. 3.
Figure 3:
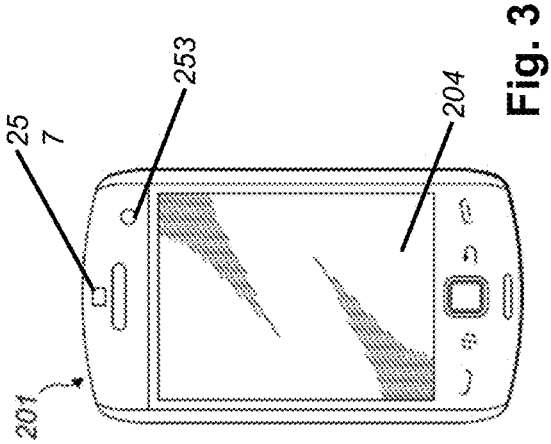
FIG. 3 is a front view of a user electronic device that may operate according to the present invention.

FIGS. 3 and 4 provide further details of the mobile electronic device 201 through which a user may work the invention as described herein. The mobile electronic device 201 comprises a display 204, the camera 253, and an electromagnetic (EM) radiation source 257 for illuminating the area to be imaged with the camera 257. The mobile electronic device 201 is an example of a user electronic device by which a camera 253 may be used to capture image data of an official document 100. This image data may be communicated over the wireless network 101 to the server 203 and stored in the server memory 444. In the server 203, application software of the stored applications 412 executes on the processor 440 to ascertain the authenticity of the official document 100 corresponding to the received image data, as explained in an exemplary embodiment below. The result of this assessment may be communicated back across the wireless network 101 to the mobile electronic device 201 and displayed on the display 204 to a user. It will be understood that the system 10 described above is merely an exemplary system 10 for implementing the invention defined herein.

An official document 100 may take one of many forms such as a driving license, a passport, a utility or other bill, a birth certificate, a benefits book, an state identify card, or a residency permit. The term "official document" is therefore intended to cover any document that contains structured information that may be used to verify a person's identity or an aspect relating to a person, such as their address.

Figure 5:
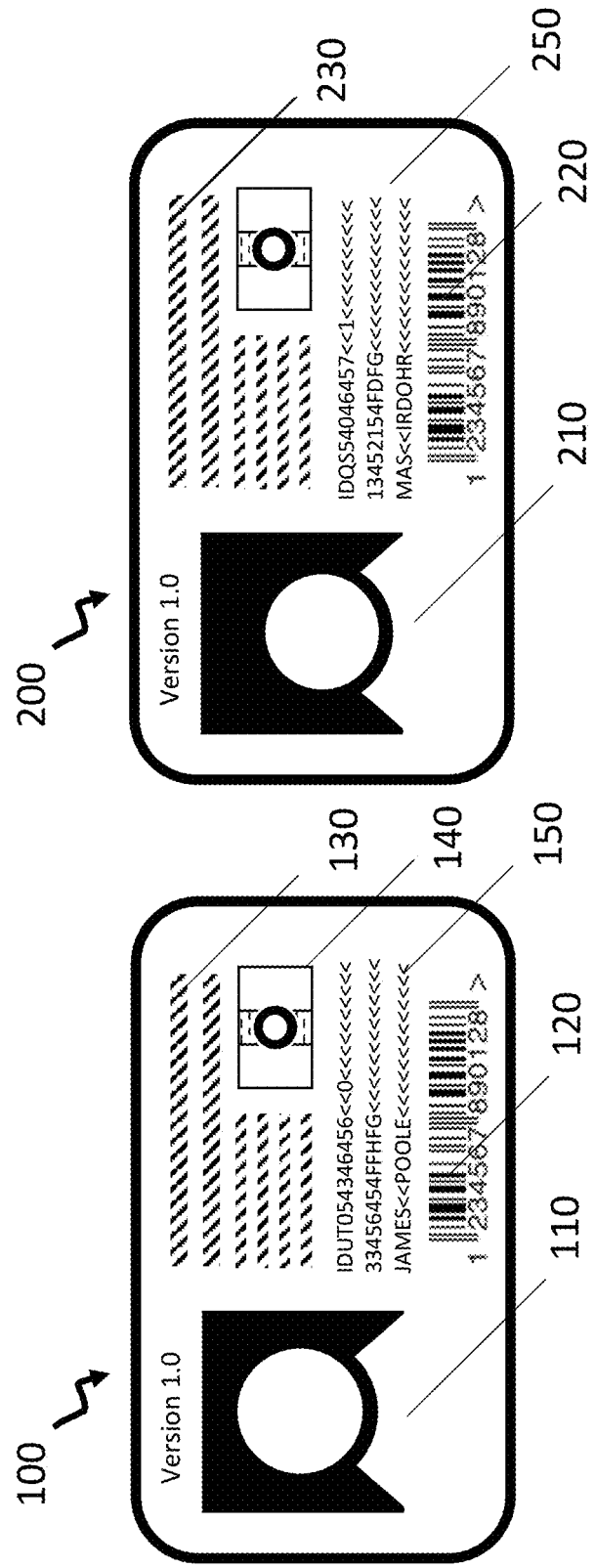
FIG. 5 is a block wireframe image of two different official documents which could be processed according to the invention.

Referring to the left hand side of FIG. 5, there is an example of first official document 100, which comprises a photo 110, a barcode 120, one or more lines of text 130, a symbol such as a national flag 140 and an MRZ 150. The structure of each section of the official document may have fixed structure and styling, possibly including using a particular font. The fixed structure and styling will be defined in a standard associated with the official document. The characters in a section of the official document may be limited to a subset of possible characters. As an example, an MRZ of an official document may be limited to upper case characters e.g. "A", "B", "C" and chevron characters "<" and ">" of Arial font of size 10 point. To reduce the likelihood of counterfeiting, the structure and format of the official document 100 may be restricted or difficult to obtain.

Referring to the right hand side of FIG. 5, there is a second official document 200 of similar type to the first official document 100. The content of features such as the photo 210, barcode 220, one or more lines of text 230, symbol 240, and MRZ 250 may vary between instance of an official document of the same type. However, since FIG. 5 represents official documents of similar type, the structure and style of the sections that are present should be similar in both official documents. In particular, the style of text in the first MRZ 150 and the style of text in the second MRZ 250 are the same though their textual content is different. If the first official document 100 is known to be genuine then any changes in the structure of the corresponding sections in the second official documents 200 suggests the second official document may be forged or counterfeit.

The authenticity of the second official document 200 can be assessed by comparison with the first official document 100. This assessment can take place regardless of the differing information that is presented in the second official document 200. It is not necessary that the same words, or even characters, are present to ascertain if the characters in the second official document 200 match the style used in the first official document 100. Testing the similarity of characters of an official document to those which are expected in an official document of the considered type is thus a flexible and adaptable way to ascertain authenticity.

The automation of the assessment of character authenticity is challenging because it is difficult to describe a character sufficiently to distinguish it from a character of a similar font without incorrectly excluding characters of the same font. A font being a collection of characters having a common style, common fonts include "Arial", "Comic Sans", or "Courier". This difficulty in accurately describing characters is exacerbated by other adverse factors that may be present in an authenticity assessment system, such as the possibility of imaging artefacts in the processed images. Additionally, for some fonts and some official documents, it is difficult to acquire information on them due to scarcity and/or prohibitions. For example, it may be illegal to digitally store certain representations of a font. In some cases, as an anti-counterfeiting means, a particular font may have been designed to make it difficult to reproduce or to require extensive analysis to discern the font from other similar fonts.

Figure 6:
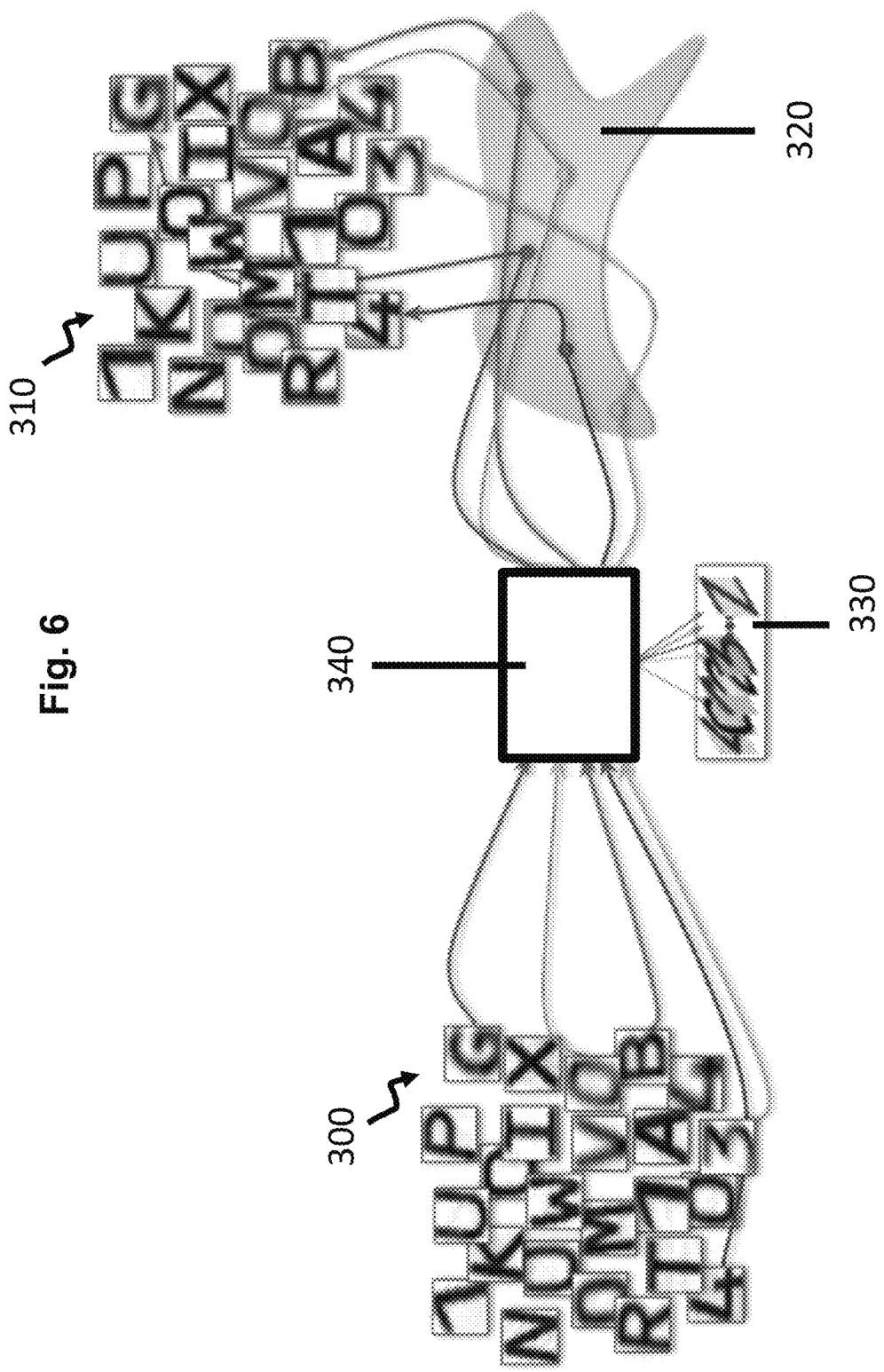
FIG. 6 is a schematic diagram of a method to train an alignment network.
Figure 7:
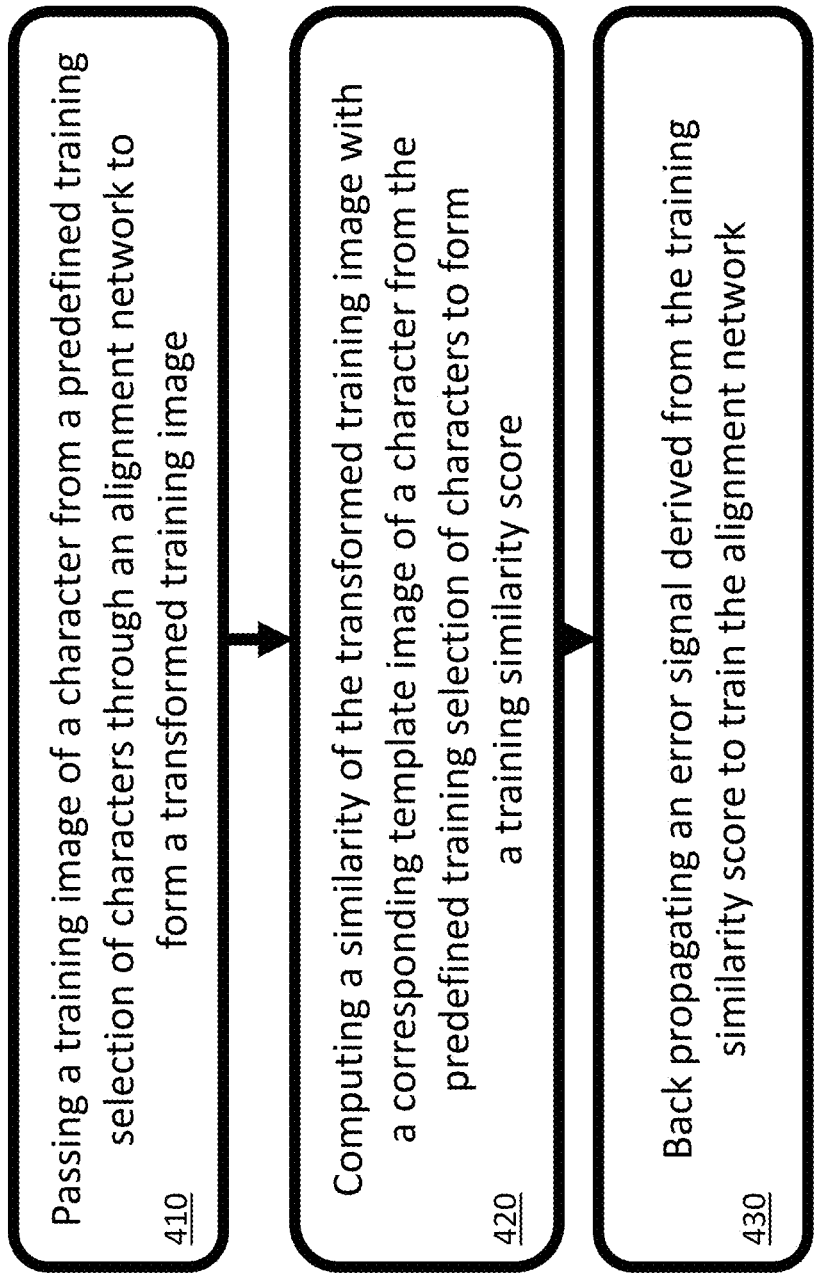
FIG. 7 is a flow diagram of a method to train an alignment network.

The present invention provides a method to check and determine character authenticity. Referring to FIG. 6 and FIG. 7, an exemplary method to train an alignment network will now be described. The alignment network is any computational module which serves to transform an input image without performing optimisation during operation. Passing an image through an alignment network produces a transformed image. Since an alignment network is not adjusted in when it is used, an alignment network must be trained before use to produce the required transformations.

The training of the alignment network may therefore occur before any other method step is performed. The training of the alignment network, and any related step, can be performed on any system or collection of systems, and the resultant trained alignment network may be used by another system that was not involved in the training. The trained alignment network can be distributed by any known manner. Therefore, the computational requirements of the system for training are relaxed and may not be related to the computational requirements of the system that use the trained alignment network.

The training process to form the alignment network comprises a number of steps. First a first set of training images is acquired. This acquisition can occur via any method that acquires image data, comprising training images, and puts it in memory in a computer. For example, this acquisition may be performed by using camera to take a photograph, or downloading an image, of an official document. The image data may include multiple documents or a document in a background setting. The image data need not necessarily display the full side of the official document. For example, a photograph may only display 70% of the front of an official document due to a thumb of a hand holding the document obscuring the remainder of the official document. This is not a problem provided there is enough of the official document visible in the image for the process to identify training images. What aspects or fraction of the official document must be in an acquired image to identify the training images will depend on the distinctiveness and form of the particular type of the official document. For example, one official document may comprise one text field, in a predefined location, having one character, which will provide one training image; whereas another official documents may comprise three text fields with varying numbers of characters according to their textual context, which will provide multiple training images.

The segments of the image data bounding characters are identified in the acquired image data. This identification may comprise cropping to the image data to one or more relevant segments. Training images are selected according to the location of characters in the segments with can be assessed using a variety of methods, which are well known to the skilled person in image to text processing. Preferably, OCR processes are used. Optionally, a convolutional neural network based process is used. Preferably, the training imagery is split up into a series of training images that each comprise one character. The training images are preferably acquired from at least one section of at least one official document. The training images therefore comprise characters from a predefined training selection of characters, and are acquired from genuine official documents and represent authentic characters that would be expected to be present in such official documents.

The predefined training selection of characters need not be limited to a single style, type, case, or size of character. However, to reduce the size of the alignment manifold that is produced and the computational challenge associated with training, it is preferably to select the predefined training selection of characters to keep the number of characters as low as possible. Ideally, the characters of the predefined training selection of characters should also be as similar as possible, because then knowledge across similar characters may be shared, significantly reducing the computational power needed for training and the size of the alignment network.

Typically, the training images 300 are a series of images, each image depicting a single character of a font associated with the official document. A considered official documents may have an MRZ, which comprises characters from a selection of chevrons and upper case characters. In this case, the predefined training selection of characters may be the selection of characters that are used in the MRZ.

For each training image, the process shown in FIG. 7 occurs. In one example, a computational module comprising unsupervised machine learning algorithm 340 is used to produce a conditional alignment network 320.

For each training image, the training process comprises passing 410 a training image through the conditional alignment network. This step may comprise evaluating a training transform using the conditional alignment network, then applying the training transform to the training image to form a transformed training image. In some cases, the transformed training image may be considered and stored as the training transform and the training image, rather than a final image of resultant transformed training image. How the resultant transformed training image is stored does not affect the working of the method.

The transformed training image is then tested against a predefined training selection of characters. In other words, the similarity of the transformed training image with a corresponding template image of the character from the predefined training selection is calculated. There are at least two training similarity testing methods to find the corresponding template character from the predefined training selection of characters which correspond to the character in a particular training image.

The first training similarity testing, is called explicit OCR, and uses data from an OCR process that has been performed on the training images. The OCR process is completed in any of a number of known ways and may be performed before the image data is split into training characters, or after splitting. For a sample training character, the associated OCR label can be used to select the matching image from the predefined training selection of characters. For example, if a training image comprises an "E" character the OCR label will be "E" and thus the "E" character image from the predefined training characters will be used for similarity testing.

The second training similarity testing, is called implicit OCR, and does not use data from an OCR process but instead compares a training image with each image from the predefined training characters. The image from the predefined training characters having the maximum similarity score is then used to identity the character label of the training image. For example, a training image without OCR data may be compared to every one of the MRZ characters and the "E" character may be found to result in the greatest similarity score. The training image would therefore have been implicitly recognised as comprising an "E" character.

In some cases, implicit OCR is performed when there is insufficient data for explicit OCR to be performed. In other cases, implicit OCR may be performed when the OCR process reports a low confidence in the assigned character. Implicit OCR can also be used as a check on the label assigned by explicit OCR, or combinations of implicit and explicit OCR can be used to increase confidence in the selection of the predefined training character that is said to correspond to the character in the training image.

The computing 420 of a similarity between the transformed training image and the corresponding template character from the predefined training selection of characters can be performed by any known comparison method. In one example, a normalized cross-correlation is used to estimate the similarity. The result of the similarity assessment is then used to estimate alignment errors. Because the similarity measure is high for well-aligned characters of the same style (subject to differences such as background, noise level, and resolution), the problem of alignment network forming can be cast as a conditional similarity maximisation problem.

The similarity score from the similarity assessment is then used to form an error signal that is back propagated 430 through the machine learning algorithm 340 to refine the conditional alignment network 320. The machine learning algorithm 320 is thus trained in an unsupervised manner.

In a preferred example, the error signal is used to adapt a conditional Densely fused Spatial Transformer Network, DeSTNet. Further details of a DeSTNet are described in Annunziata, R. et al., "DeSTNet: Densely Fused Spatial Transformer Networks" British Machine Vision Conference (BMVC), 2018. The trained DeSTNet forms a conditional alignment manifold that estimates the best global transformation that would align the training images to the corresponding template images. In one example, a normalised cross-correlation loss is adopted: to estimate alignment errors in a fully unsupervised way, and to learn conditional DeSTNet weight parameters. The resultant character based DeSTnet is said to be trained, i.e. the alignment manifold is implicitly learnt, when this all training images have been processed.

Figure 8:
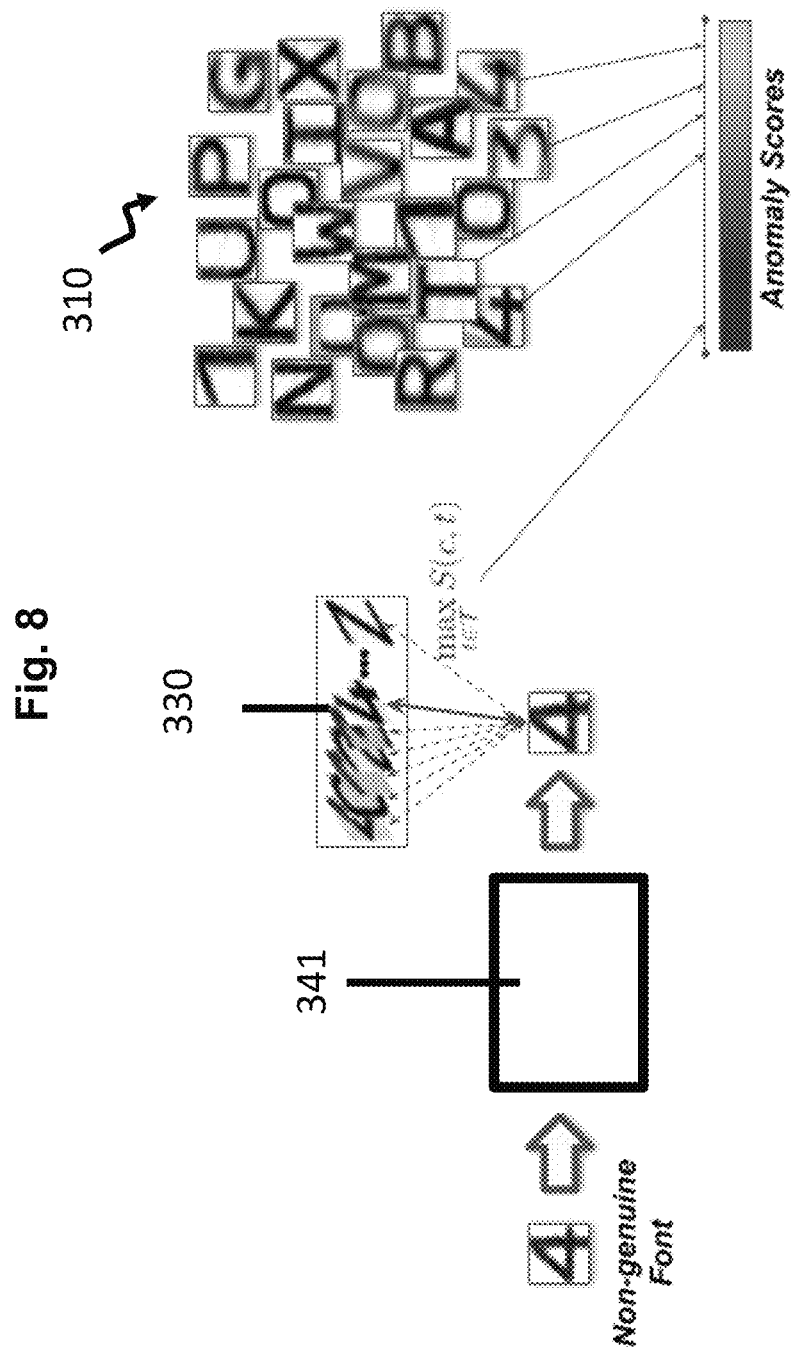
FIG. 8 is a schematic diagram of a method to test the authenticity of a sample image.
Figure 9:
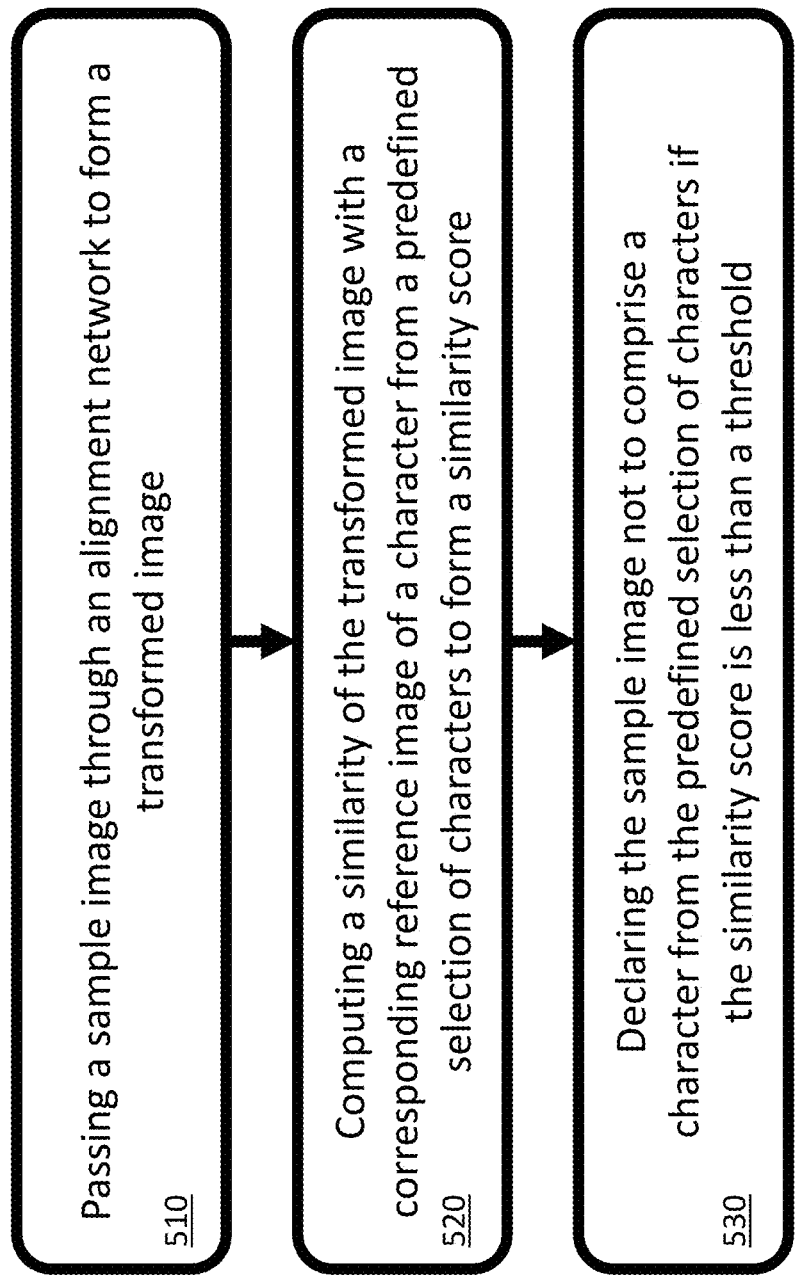
FIG. 9 is a flow diagram of a method to test the authenticity of a sample image.

Once the alignment network has been formed, it can be used to test sample images using the method illustrated in FIGS. 8 and 9. A sample image is any image of an official document that is to be tested to ascertain whether or not it comprises a character from a predefined selection of characters.

The method comprises processing a sample image with a trained alignment network. This process is similar to the equivalent training step. A sample image is passed 510 through the alignment network to form a transformed image. This step may comprise processing the sample image with an alignment network to form a corrective transformation and applying the corrective transformation to the sample image to form the transformed image. In some cases, the transformed image may be considered and stored as the corrective transform and the sample image, rather than a final image of resultant transformed image. How the resultant transformed image is stored does not affect the rest of the method.

Next, a similarity between the transformed image with a corresponding reference image of a character from the predefined selection of characters is computed 520 to form a similarity score. The method of the computing 520 of the similarity is equivalent to the method of computing 420 of the similarity that is performed in the training methods described above. Consequently, as in training, implicit and explicit OCR may be performed individually or a combination of implicit and explicit OCR may be performed. The calculated similarity scores of the characters may also be recorded or declared.

Finally, if the similarity score is less than a threshold the sample image is declared 530 not to comprise a character from the predefined selection of characters. In some cases, the threshold is set for every character. In this case, every character is uniquely and independently assessed. In other cases, the threshold will be an adaptive threshold that adapts according to other results. For example, the threshold may be based on a combined score of a plurality of sample images. The adaptation of the threshold provides a convenient and fast way to adjust the accuracy of the assessment of the sample images.

The sample image, or the training images, can be acquired in a number of known methods such as loading a file, taking and/or transferring a photograph, scanning an official document, or receiving and/or loading an image on to a computer. Acquisition of the images is therefore not limited to a particular method of acquiring the image data. Acquisition of the image data may therefore also comprise communication of the acquired image data to another system.

The above-described method can be used to test the authenticity of an official document. This test starts by acquiring an official document image of the official document and identifying the position of one or more characters in the official document image. For at least one identified character, the official document image is segmenting to form a sample image. The sample image is then passing through an alignment network to form a transformed image. A similarity of the transformed image with a corresponding reference image of a character from a predefined selection of characters is the computed to form a similarity score. Each processed sample image is declared not to comprise a character from the predefined selection of characters if its similarity score is less than a threshold. The threshold may be an adaptive threshold as described above. The official document is then declared not to be genuine if a set number of sample images are declared not to comprise a character from the predefined selection of characters.

The example use may further comprise identifying characters from at least a part of a type of official document, such as the MRZ in UK passports. The alignment network that is used may be a conditional alignment manifold produced by unsupervised training of a DeSTNet using training images that comprise an individual character from the part of the type of official document, which for the MRZ may be all upper case characters and a chevron of a the font used in the MRZ.

The result of this determination of the authenticity of the official document may be communicated to an operator or to a user, e.g. via electronic device 201, 202, who supplied the sample document. The calculated similarity scores of the characters may also be recorded or declared to users or operators. The report of the similarity score may be broken down to list individual sample image scores or it may produce a combined similarity score. The combined similarity score may be considered as a confidence in the authenticity of the official document. In some cases, the report of the similarity score may be declared to users and/or operators instead of the binary outcome of whether the official document is authentic or not. This provides additional information and may help to warn users if an official document is degrading to the point it may start to fail future authenticity assessment. However, as this information may be advantageous to fraudsters, in other cases, only the operator and trust third parties will receive this additional information.

The result of the official document's authenticity assessment may indicate that further authenticity checking is required. Alternatively, it may automatically repeat the assessment of authenticity, request further images of the official document, or request other official documents to be supplied.

Operators may also provide information dependent on the result of the determination of the official document. They may also flag the result of the assessment as a false positive or false negative. All of this data may be recorded and used to fine tune the method and the operational parameters to improve future performance. In some cases, the recording of this information and the feedback may by an offline procedure. In other cases, the method may adjust operational parameters, and/or signal that further retraining of the alignment network is required.

Other known methods for character assessment are only able to give an indication of a degree of similarity based on structural features and have issues with characters that are visually similar. Due to the highly limited ability of the alignment network to align any non-selected characters it does not suffer from such a drawback.

The described authenticity assessment methods only needs imagery representing genuine official documents and do not need imagery representative of forged official document. In other words, they can declare an official document as genuine based on the similarity to genuine official documents rather than declaring an official document as a forgery based on the similarity to forged official documents. Therefore, in contrast to known methods, they are sensitive to forged official document that have been forged in a way that was not known when the systems were formed/trained.

It is also easier for operators to acquire and store imagery representing genuine official documents than imagery representative of forged official documents. The above described authenticity assessment methods, in contrast to known methods, do not require the expensive acquisition of a large sample of forged/fraudulent data nor do they require the training imagery to be annotated by highly skilled fraud experts. As a consequence, it is easier for operators to release and update systems using the above described authenticity assessment methods.

Systems for checking official documents as described above operate very quickly checking each character in less than 12 ms or less than 5 ms per character per CPU, when explicit OCR label is used. This amounts to processing a typical document with two 44 character MRZ lines in less than a second or less than 0.44 s on a CPU. If implemented on a GPU, the operation may be even faster.

The training and/or testing methods described above, and shown in FIGS. 6 to 9, may in one embodiment be executed by a server 203. The sample image that is input to the testing method may be image data of an official document captured by camera 253 of mobile electronic device 201 that is communicated to the server 203. The mobile electronic device 201 can include an application executable on the device 201 which coordinates the use of the camera 253, the communication of the image data to the server 203, and the reporting on the display 204 of the assessment result reported by the server 203. A user may therefore work the invention via mobile electronic device 201 or, alternatively, via any other user electronic device that is connected to the wireless network 101.

Such user electronic devices 201, 202 are generally termed communication devices and may be mobile or handheld devices, such as a mobile or handheld communication device. They may also have the capability to communicate with other computer systems; for example, via a data link or network, such as a short-range radio frequency link, e.g. Bluetooth, or via a data network, which may be wireless and/or may be connected to the Internet. In certain embodiments, the user electronic device is a multiple-mode communication device configured for both data and voice communication, a mobile telephone, such as a smartphone as shown in FIG. 3, a wearable computer such as a watch, a tablet computer, a personal digital assistant, or a computer system such as a notebook, laptop, or desktop system. The user electronic device may take other forms apart from those specifically listed above, for example a fixed location server or a remotely accessed computer system. The user electronic device may also be referred to as a mobile, handheld or portable communications device, a communication device, or a mobile device. In the context of this disclosure, the term "mobile" means the device is of a size or weight which makes it readily portable by an individual.

The electronic devices 201, 202 may include a controller including a processor 240 (such as a microprocessor) which controls the operation of the electronic device 201, 202 In certain electronic devices, more than one processor is provided, typically, with each processor in communication with each other and configured to perform operations in parallel, so that they together control the overall operation of the electronic device. The processor 240 interacts with device subsystems, such as a wireless communication subsystem 211 for exchanging radio frequency, or microwave frequency, signals with a wireless network 101 to perform communication functions. The processor 240 is communicably coupled with additional device subsystems, some of which are shown on FIG. 4, including:

one or more output interfaces 205 (such as one or more of: a display 204, a speaker 256, and a electromagnetic (EM) radiation source 257);

one or more input interfaces 206 (such as one or more of: a camera 253, microphone 258, keyboard, control buttons, a navigational input device, and a touch-sensitive overlay) associated with at least one of a touchscreen 204, an orientation subsystem 249, and memory 244 (such as flash memory, random access memory (RAM), read only memory (ROM), etc.);

auxiliary input/output (I/O) subsystems;

a data port (which may be a serial data port, such as a Universal Serial Bus (USB) data port);

an external video output port;

a near field communications (NFC) subsystem;

a short-range communication subsystem;

a clock subsystem;

a battery interface; and other device subsystems.

Some of the subsystems perform communication-related functions, whereas other subsystems may provide "resident" or on-device functions.

The electronic device 201, 202 stores data 227 in an erasable persistent memory, which in one embodiment is the memory 244. In various embodiments, the data 227 includes service data including information used by the electronic device 201, 202 to establish and maintain communication with the wireless network 101. The data 227 may also include user application data such as email messages, address book and contact information, calendar and schedule information, notepad documents, presentation documents and information, word processor documents and information, spread sheet documents and information; desktop publishing documents and information, database files and information; image files, video files, audio files, internet web pages, services, applications, games and other commonly stored user information stored on the electronic device 201, 202 by its user. The data 227 may also include program application data such as functions, controls and interfaces from an application such as an email application, an address book application, a calendar application, a notepad application, a presentation application, a word processor application, a spread sheet application, a desktop publishing application, a database application, a media application such as a picture viewer, a video player or an audio player, and a web browser. The data 227 stored in the persistent memory (e.g. flash memory) of the electronic device 201, 202 may be organized, at least partially, into one or more databases or data stores.

In at least some embodiments, the electronic device 201, 202 includes a touchscreen which acts as both an input interface 206 (e.g. touch-sensitive overlay) and an output interface 205 (i.e. display). The touchscreen may be constructed using a touch-sensitive input surface which is connected to an electronic controller and which overlays the display 204. The touch-sensitive overlay and the electronic controller provide a touch-sensitive input interface 206 and the processor 240 interacts with the touch-sensitive overlay via the electronic controller.

As noted above, in some embodiments, the electronic device 201, 202 includes a communication subsystem 211 which allows the electronic device 201, 202 to communicate over a wireless network 101. The communication subsystem 211 includes a receiver, a transmitter, and associated components, such as one or more antenna elements 214, local oscillators (LOs) 216, and a processing module such as a digital signal processor (DSP) 217 which is in communication with the processor 240. The antenna elements 214 and 215 may be embedded or internal to the electronic device 201, 202 and a single antenna may be shared by both receiver and transmitter. The particular design of the wireless communication subsystem 211 depends on the wireless network 101 in which electronic device 201, 202 is intended to operate.

In at least some embodiments, the electronic device 201, 202 also includes a device orientation subsystem 249 including at least one orientation sensor which is connected to the processor 240 and which is controlled by one or a combination of a monitoring circuit and operating software. The orientation sensor detects the orientation of the electronic device 201, 202 or information from which the orientation of the electronic device 201, 202 can be determined, such as acceleration. An orientation sensor may generate orientation data which specifies the orientation of the electronic device 201, 202.

The electronic device 201, 202 includes a microphone or one or more speakers. In at least some embodiments, the electronic device 201, 202 includes a plurality of speakers 256. Each speaker 256 may be is associated with a separate audio channel. The multiple speakers may, for example, be used to provide stereophonic sound (which may also be referred to as stereo).

The electronic device 201, 202 may also include one or more cameras 253. The one or more cameras 253 may be capable of capturing images in the form of still photographs or motion video. In at least some embodiments, the electronic device 201, 202 includes a front facing camera 253. A front facing camera is a camera which is generally located on a front face of the electronic device 201. The front face is typically the face on which a display 204 is mounted. That is, the display 204 is configured to display content which may be viewed from a side of the electronic device 201, 202 where the camera 253 is directed. The front facing camera 253 may be located anywhere on the front surface of the electronic device; for example, the camera 253 may be located above or below the display 204. The camera 253 may be a fixed position camera which is not movable relative to the display 204 of the electronic device 201, 202 or the housing of the electronic device 201, 202. In such embodiments, the direction of capture of the camera is always predictable relative to the display 204 or the housing. In at least some embodiments, the camera may be provided in a central location relative to the display 204 to facilitate image acquisition of a face. A back facing camera may be used alternatively to, or in addition to, in some embodiments.

In at least some embodiments, the electronic device 201, 202 includes an electromagnetic (EM) radiation source 257. In at least some embodiments, the EM radiation source 257 is configured to emit electromagnetic radiation from the side of the electronic device which is associated with a camera 253 of that electronic device 201, 202. For example, where the camera is a front facing camera 253, the electronic device 201, 202 may be configured to emit electromagnetic radiation from the front face of the electronic device 201, 202. That is, in at least some embodiments, the electromagnetic radiation source 257 is configured to emit radiation in a direction which may visible by the camera. That is, the camera 253 and the electromagnetic radiation source 257 may be disposed on the electronic device 201, 202 so that electromagnetic radiation emitted by the electromagnetic radiation source 257 is visible in images detected by the camera.

In some embodiments, the electromagnetic radiation source 257 is an infrared (IR) radiation source which is configured to emit infrared radiation. In at least some embodiments, the electromagnetic radiation source 257 may be configured to emit radiation which is not part of the visible spectrum. The camera 253 may be a camera which is configured to capture radiation of the type emitted by the electromagnetic radiation source 257. Accordingly, in at least some embodiments, the camera 253 is configured to capture at least some electromagnetic radiation which is not in the visible spectrum.

The electronic device 201, 202 also includes a battery 238 as a power source, which is typically one or more rechargeable batteries that may be charged. The processor 240 operates under stored program control and executes software modules 221 stored in memory such as persistent memory; for example, in the memory 244. The software modules 221 include operating system software 223 and other software applications 225.

The electronic device 201, 202 processor 240 is configured to execute executable code stored in memory, wherein the executable code comprises instructions for performing the method of the present invention. The code can be stored in any suitable memory.

The electronic device 201, 202 can be supplied with the code preinstalled. Alternatively, the code can be loaded by the user or others on to the phone in the ways that are known to the skilled person, such as by data transfer through a USB cable or by downloading the code via a wireless communication Preinstalling or loading the code is equivalent to installing the code. Preferably, the code is in the form of an application. The application can be provided by a third party application providing service, as is common on modern electronic devices. Code updates may be loaded on to the electronic devices in a similar manner.

The code may operate by contacting one or more external systems, such as a server 203, and exchanging data with the external systems. This prevents all the processing, or calculations, having to occur on the electronic device 201, 202 which is useful to spare processing load and thus battery power. The electronic device 201, 202 may use one preferred communication method to exchange data or it may select the optimal communication method in light of those that are available, The selection of communication methods can be adaptive or responsive. By way of non-limiting example, if a wireless network communication signal using the IEEE 802.11 standard (WiFi) is initially available but lost, as the electronic device moves out of WiFi range, the electronic device may switch to a wireless network communication signal using the CDMA200 standard (3G) to continue the data exchange with the server 203. The data may be seamlessly transferred without interruption or the data transfer may pause during the switch over and be restarted thereafter either automatically or by the user.

In some embodiments, all the processing can occur on a user electronic device to prevent the need to contact external systems. This is especially useful if the user electronic device is a portable electronic device that may move into area in that is outside of all useful communications networks, since the functionality of the method is then not dependent of the availability of a communication network. In some cases, the execution of the code may cause the user electronic device to ascertain whether or not a communications network is available and select the operation mode accordingly, the assessment may be ongoing, periodic, or occur a limited number of times.

The code may provide flags, signals, or indications to other applications or services that the user electronic device is equipped with the extra functionality afforded by the present invention. Additionally, the code may be accessible by other applications or services to provide its functionality within the other application and services. For example, once installed the code may flag a financial application that extra security features are installed. The financial application may thus unlock, or enable, more sensitive functions and execute the code, to increase security, when these features are used. An exemplary use of code, which executes in accordance with the present invention, is described below.

Consider a user who wishes to register for a secure service, which requires registered users to be authenticated, this can be achieved via an application (or webpage) accessed via electronic device 201, 202. When the application is first accessed it checks the features and applications loaded on to the electronic device 201, 202, and proceeds to advise the user to install an identification authentication application. It may also direct the user to a location to download the identification authentication application. The user proceeds to download the identification authentication application and load it on to the electronic device 201, 202. When the user returns to the service, the service detects that the identification authentication application is loaded and executes, or calls, the identification authentication application. The identification authentication application then prompts the user, via display 204 or speaker 256, to use the camera 253 to take a photo of an official identification document, possibly using a separate camera application. Once a photo of an official document has been acquired, the identification authentication application sends the image data to a server 203 that performs an assessment of whether the photographed official document is genuine by assessing the authenticity of the characters using the methods described above. The result is communicated from the server 203 back to the service. The service knows the identification authentication application provides only information that has been checked for authenticity. Therefore, the service can use the supplied information to register the new user.

If the server 203 had decided that the photographed official document was not genuine it may provide information to alert the service. Alternatively, it may alert the user and request further images of the official document or request images of alternative official documents.

Additional methods to ascertain the authenticity of the official document, such as calling the user to conduct a telephone interview, may also be performed to increase confidence in the result reported by the security application.

The following is a list of embodiments of this disclosure which form part of the description:

1. A computer-implemented method for assessing if a sample image comprises one or more characters from a predefined selection of characters, comprising:
    passing the sample image through an alignment network to form a transformed image, the alignment network being configured to align images of characters within the sample image with images of characters from the predefined selection of characters, and thereby generate the transformed image;
    computing a similarity of one or more characters within the transformed image with one or more corresponding reference images of characters from the predefined selection of characters to form a similarity score of characters in the sample image with the characters of the predefined selection of characters; and
    declaring the sample image not to comprise at least one character from the predefined selection of characters if the similarity score indicates a significant enough difference.
2. The computer-implemented method of embodiment 1, wherein the step of passing a sample image through an alignment network to form a transformed image comprises:
    processing the sample image with the alignment network to form a corrective transformation; and
    applying the corrective transformation to the sample image to form a transformed image.
3. The computer-implemented method of embodiment 1 or 2, wherein the alignment network comprises a conditional alignment manifold.
4. The computer-implemented method of embodiment 3, further comprising forming the conditional alignment manifold using an unsupervised machine learning algorithm.
5. The computer-implemented method of embodiment 4, wherein the unsupervised machine learning algorithm comprises a densely fused spatial transformer network.
6. The computer-implemented method of embodiment 4 or 5, wherein the step of forming the conditional alignment manifold further comprises:
    training with training images comprising a selection of characters from a predefined training selection of characters.

7. The computer-implemented method of embodiment 6, wherein each training image comprises a character from the predefined training selection of characters.
8. The computer-implemented method of embodiment 6 or 7, wherein the predefined training selection of characters consists of all characters that are associated with a section of an official document.
9. The computer-implemented method of any preceding embodiment, wherein the predefined selection of characters consists of all characters that are associated with a section of an official document.
10. The computer-implemented method of embodiment 8 or 9, wherein all characters that are associated with a section of an official document comprises
all upper case characters and a chevron character of a font used in a machine readable zone of an official document.
11. The computer-implemented method of any one of embodiments 6 to 10, wherein for each training image, the training further comprises
passing a training image through an alignment network to form a transformed training image.
12. The computer-implemented method of embodiment 11, wherein
passing a training image through an alignment network to form a transformed training image comprises:
evaluating a training transform to align the training image to a corresponding template image of a character from the predefined training selection of characters; and
applying the training transform to the training image to form a transformed training image.
13. The computer-implemented method of embodiment 11 or 12, wherein the training further comprises:
computing a similarity of the transformed training image with a corresponding template image of a character from the predefined training selection of characters to form a training similarity score.
14. The computer-implemented method of embodiment 13, wherein the step of computing a similarity of the transformed training image with the corresponding template image of a character from the predefined training selection of characters to form a training similarity score comprises a first training similarity testing method that comprises:
performing optical character recognition on the transformed training image to recognise a sample training character;
selecting a matching training image that comprises the sample training character from the predefined training selection of characters; and
computing the similarity of the transformed training image with the matched training image to form a training similarity score.
15. The computer-implemented method of embodiment 13 or 14, wherein the step of computing a similarity of the transformed training image with the corresponding template image of a character from the predefined training selection of characters to form a training similarity score comprises a second training similarity testing method that comprises:
computing the similarity of the transformed training image with each image from the predefined training selection of characters to form a plurality of reference training similarity scores; and
selecting the maximum value from the plurality of reference training similarity scores to form a training similarity score.
16. The computer-implemented method of embodiment 15 when dependent on embodiment 14, where the second training similarity testing method is only performed if the first training similarity testing method fails to complete.
17. The computer-implemented method of embodiment 12, or any one of embodiments 13 to 16 when dependent on embodiment 12, wherein the training transform is a linear global transformation.
18. The computer-implemented method of any one of the preceding embodiments, wherein the corrective transform is a linear global transformation.
19. The computer-implemented method of any preceding embodiment, wherein the step of computing a similarity of the transformed image with a corresponding reference image from the predefined selection of characters to form a similarity score further comprises a first similarity testing method that comprises:
performing optical character recognition on the sample image to recognise a sample character;
selecting a matching image that comprises the sample character from the predefined selection of characters; and
computing the similarity of the transformed image with the matched image to form a similarity score.
20. The computer-implemented method of any preceding embodiment, wherein the step of computing a similarity of the transformed image with a corresponding reference image from the predefined selection of characters to form a similarity score further comprises a second similarity testing method that comprises:
computing the similarity of the transformed image with each image from the predefined selection of characters to form a plurality of reference similarity scores; and
selecting the maximum value from the plurality of reference similarity scores to form a similarity score.
21. The computer-implemented method of embodiment 20 when dependent on embodiment 19, where the second similarity testing method is only performed if the first similarity testing method fails to complete.
22. The computer-implemented method of any preceding embodiment wherein the sample image is an image of a character.
23. A computer-implemented method for testing the authenticity of an official document, comprising:
obtaining an official document image of an official document;
identifying one or more characters in the official document image;
for at least one identified character, segmenting the official document image to form at least one sample image, each sample image comprising an identified character;
for each sample image, assessing if the sample image comprises a character from a predefined selection of characters using the computer-implemented method of any preceding embodiments; and
declaring the official document not to be genuine if a set number of sample images are declared not to comprise a character from the predefined selection of characters,
wherein the predefined selection of characters is a selection of characters associated with at least a part of the official document.
24. The computer-implemented method of embodiment 23, wherein the set number of sample images is one sample image.
25. The computer-implemented method of embodiment 23 or 24 when dependent on embodiment 6, wherein the predefined training selection of characters is the selection of characters associated with at least a part of the official document.

26. The computer-implemented method of any one of embodiments 23 to 25, further comprising issuing a communication depending on whether the official document was declared to be genuine or not.

27. A computer-readable medium comprising executable instructions for performing the method of any one of the preceding embodiments.

28. A computer comprising a processor configured to execute executable code stored in memory, wherein the executable code comprises instructions for performing the method of any one of the preceding embodiments.

29. A system comprising at least two computers having computing modules which cooperate to perform the method of any one of embodiments 1 to 26.

30. The computer-implemented method of any preceding embodiment, wherein declaring the sample image not to comprise at least one character from the predefined selection of characters if the similarity score indicates a significant enough difference comprises:

evaluating if the similarity score is less than, or greater than, than a predefined threshold score, and if so declaring the sample image not to comprise at least one character from the predefined selection of characters.

31. A computer-implemented method for forming an alignment network for a predefined training selection of characters comprising:

acquiring a plurality of training images, each training image comprising a character from a predefined training selection of characters; and for each training image, performing the following steps
  passing a training image through a densely fused spatial transformer network to form a transformed training image;
  computing the similarity of the transformed training image with a corresponding template image of a character from the predefined training selection of characters to form an error signal; and
  training the densely fused spatial transformer network with the error signal, wherein, after the plurality of training images has been processed, the densely fused spatial transformer network comprises an alignment network for the predefined training selection of characters.

The present invention has been described above by way of example only, and modifications of detail may be made which fall within the scope of the invention which is defined by the appended embodiments.

What is claimed is:

1. A computer-implemented method for assessing if a sample image comprises one or more characters from a predefined selection of characters, the method comprising:
  passing the sample image through an alignment network to form a transformed image, the alignment network being configured to align images of characters within the sample image with images of characters from the predefined selection of characters, and thereby generate the transformed image;
  computing a similarity of one or more characters within the transformed image with one or more corresponding reference images of characters from the predefined selection of characters to form a similarity score of characters in the sample image with the characters of the predefined selection of characters; and
  declaring the sample image not to comprise at least one character from the predefined selection of characters if the similarity score indicates a significant enough difference.

2. The computer-implemented method of claim 1 wherein the step of passing a sample image through an alignment network to form a transformed image comprises:
  processing the sample image with the alignment network to form a corrective transformation; and
  applying the corrective transformation to the sample image to form a transformed image.

3. The computer-implemented method of claim 1 wherein the alignment network comprises a conditional alignment manifold.

4. The computer-implemented method of claim 3 further comprising:
  forming the conditional alignment manifold using an unsupervised machine learning algorithm.

5. The computer-implemented method of claim 4 wherein the unsupervised machine learning algorithm comprises a densely fused spatial transformer network.

6. The computer-implemented method of claim 4 wherein the step of forming the conditional alignment manifold further comprises:
  training with training images comprising a selection of characters from a predefined training selection of characters.

7. The computer-implemented method of claim 6 wherein each training image comprises a character from the predefined training selection of characters.

8. The computer-implemented method of claim 6 wherein the predefined training selection of characters consists of all characters that are associated with a section of an official document.

9. The computer-implemented method of claim 1 wherein the predefined selection of characters consists of all characters that are associated with a given section of an official document.

10. The computer-implemented method of claim 8 wherein all characters that are associated with a section of an official document comprises
  all upper case characters and a chevron character of a font used in a machine readable zone of an official document.

11. The computer-implemented method of claim 1 wherein the step of computing a similarity of the transformed image with a corresponding reference image from the predefined selection of characters to form a similarity score further comprises a first similarity testing method that comprises:
  performing optical character recognition on the sample image to recognise a sample character;
  selecting a matching image that comprises the sample character from the predefined selection of characters; and
  computing the similarity of the transformed image with the matched image to form a similarity score.

12. The computer-implemented method of claim 1 wherein the sample image is: an image of a single character, or an image comprising multiple characters.

13. A computer-implemented method for testing the authenticity of an official document, the method comprising:
  obtaining an official document image of an official document;
  identifying one or more characters in the official document image;

for at least one identified character, segmenting the official document image to form at least one sample image, each sample image comprising an identified character;

for each sample image, assessing if the sample image comprises a character from a predefined selection of characters using the computer-implemented method of claim 1; and declaring the official document not to be genuine if a set number of sample images are declared not to comprise a character from the predefined selection of characters, wherein the predefined selection of characters is a selection of characters associated with at least a part of the official document.

14. The computer-implemented method of claim 13 wherein the set number of sample images is one sample image.

15. The computer-implemented method of claim 13 wherein the predefined training selection of characters is the selection of characters associated with at least a part of the official document.

16. A computer-readable medium comprising computer executable instructions for performing the method of claim 1.

17. A computer comprising a processor configured to execute executable code stored in memory wherein the executable code comprises instructions for performing the method of claim 1.

18. The computer-implemented method of claim 1 wherein declaring the sample image not to comprise at least one character from the predefined selection of characters if the similarity score indicates a significant enough difference comprises:

evaluating if the similarity score is less than, or greater than, than a predefined threshold score, and if so declaring the sample image not to comprise at least one character from the predefined selection of characters.

19. A computer-implemented method for forming an alignment network for a predefined training selection of characters, the method comprising:

acquiring a plurality of training images, each training image comprising a character from a predefined training selection of characters; and for each training image, performing the following steps
passing a training image through a densely fused spatial transformer network to form a transformed training image;

computing the similarity of the transformed training image with a corresponding template image of a character from the predefined training selection of characters to form an error signal; and training the densely fused spatial transformer network with the error signal, wherein, after the plurality of training images has been processed, the densely fused spatial transformer network comprises an alignment network for the predefined training selection of characters.

* * * * *